United States Patent [19]

Pinnell et al.

[11] 4,052,894
[45] Oct. 11, 1977

[54] VELOCITY VECTOR SENSOR FOR LOW SPEED AIRFLOWS

[75] Inventors: William R. Pinnell, Dayton; James E. Leger, Enon, both of Ohio

[73] Assignee: The United States of America as represented by the Secretary of the Air Force, Washington, D.C.

[21] Appl. No.: 737,946

[22] Filed: Nov. 2, 1976

[51] Int. Cl.² ............................................. G01W 1/02
[52] U.S. Cl. ............................................. 73/189
[58] Field of Search ..................... 73/189, 186, 181

[56] References Cited

U.S. PATENT DOCUMENTS

| | | | |
|---|---|---|---|
| 3,094,869 | 6/1963 | Wehmann | 73/189 |
| 3,304,778 | 2/1967 | Stuart | 73/189 |
| 3,713,336 | 1/1973 | Bernstein et al. | 73/189 |

Primary Examiner—James J. Gill
Assistant Examiner—Anthony V. Ciarlante
Attorney, Agent, or Firm—Joseph E. Rusz; Robert Kern Duncan

[57] ABSTRACT

A dual pivoting vane having a miniature dual bead thermistor anemometer at its upstream extremity and with light beam angular position sensors on the pivot axes provides a sensitive velocity vector sensor for measuring both magnitude and direction of low velocity airflow relative to a three-dimensional reference space of the body carrying the velocity vector sensor.

1 Claim, 13 Drawing Figures

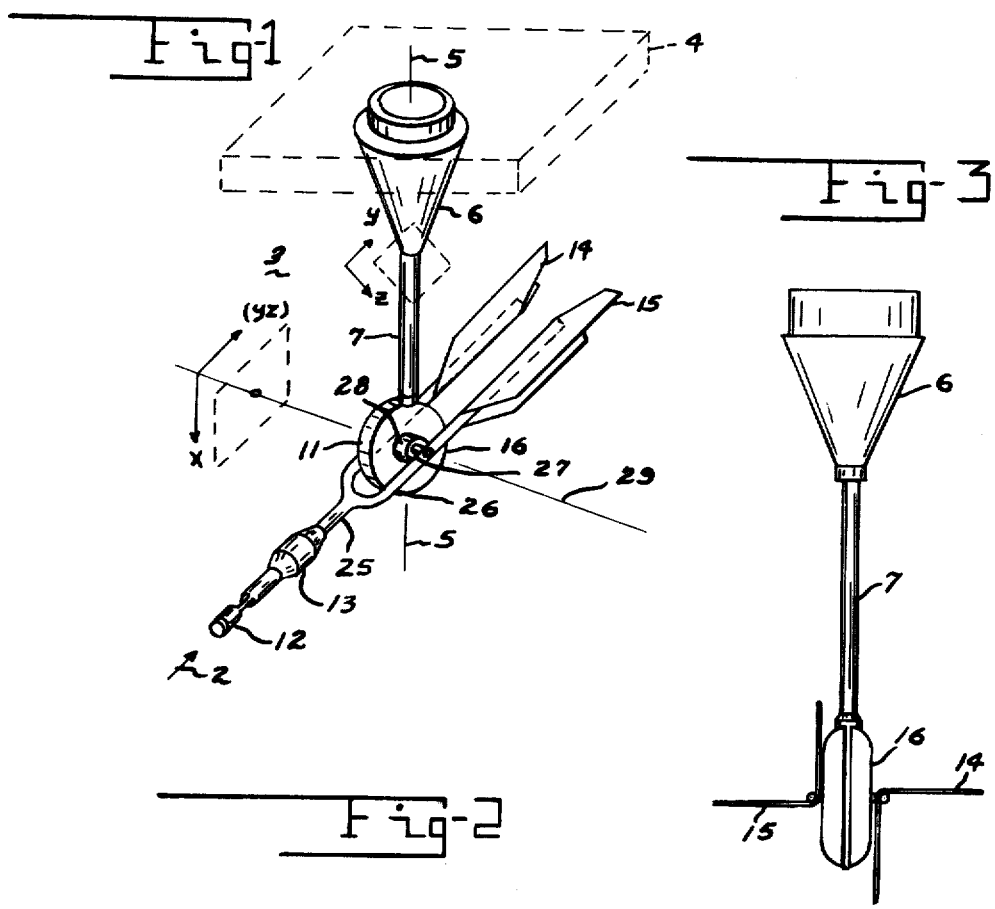
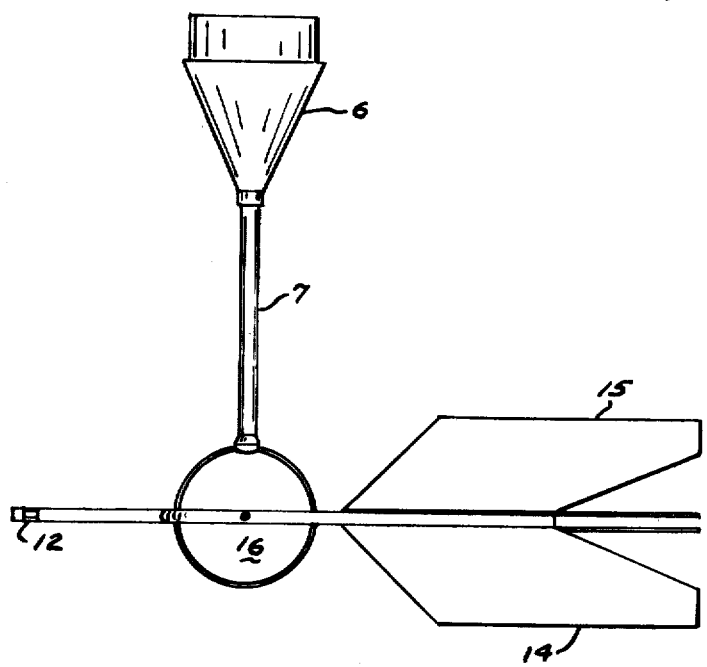

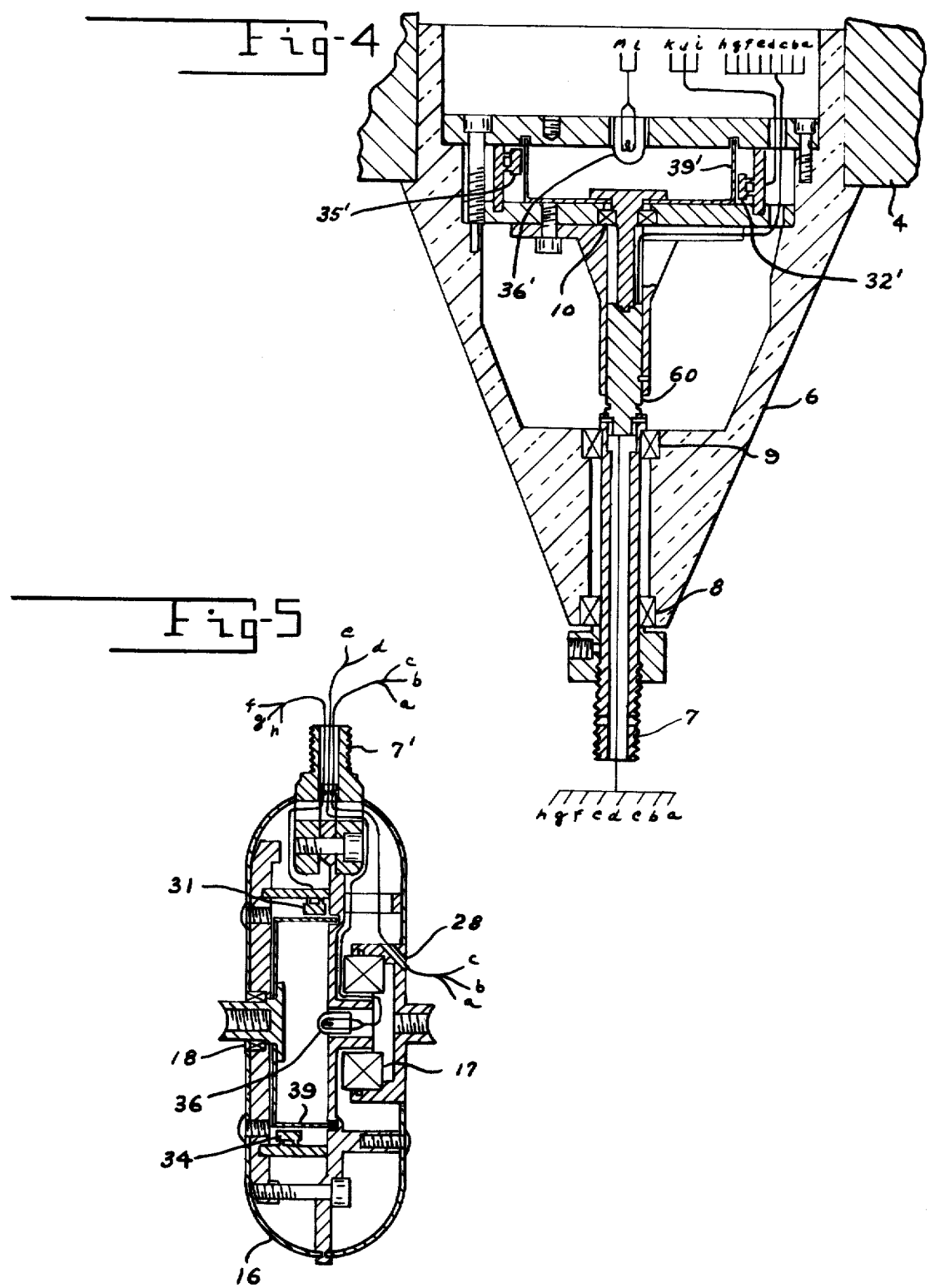

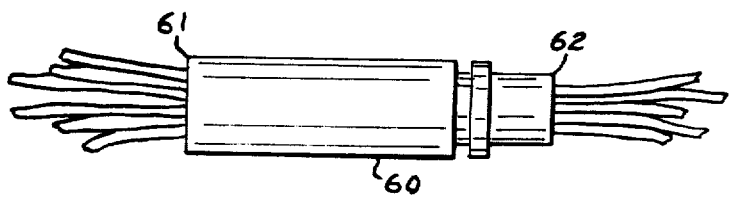
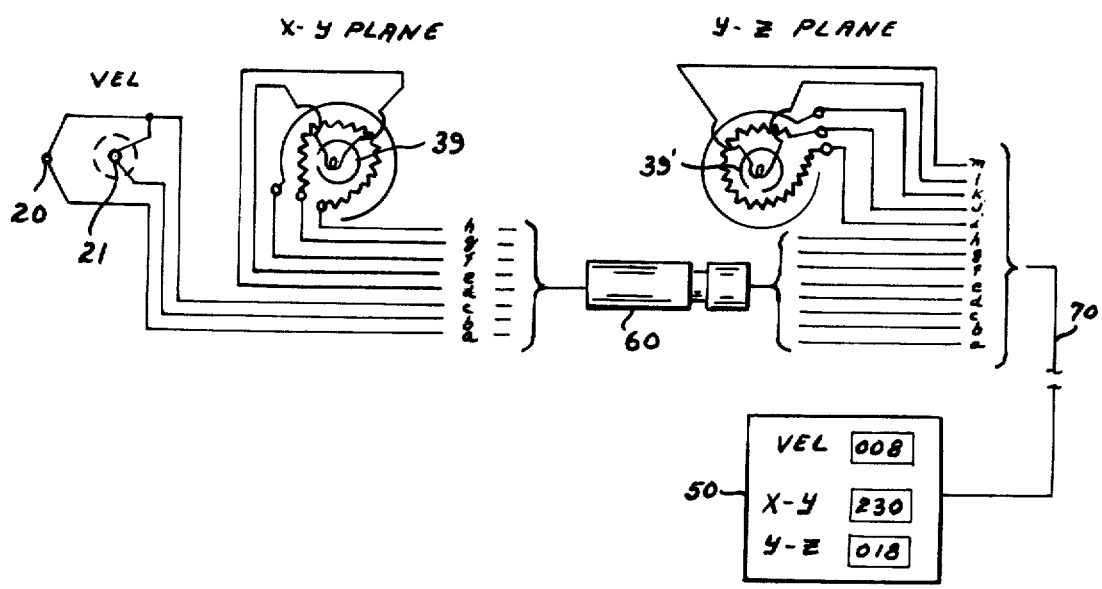

VELOCITY VECTOR SENSOR FOR LOW SPEED AIRFLOWS

RIGHTS OF THE GOVERNMENT

The invention described herein may be manufactured and used by or for the Government of the U.S. for all governmental purposes without the payment of any royalty.

BACKGROUND OF THE INVENTION

The field of the invention is in fluid flow measuring apparatus and more particularly in apparatus for sensing both magnitude and direction of relatively low speed airflows.

The importance of obtaining continuous data which describes the complete velocity vector for flow of air relative to a body traveling through an air mass is well recognized. For instance, this data is necessary to evaluate the aerodynamic performance of parachute systems, balloons, wind sails, kites, and similar airborne devices. This information can be utilized to evaluate the aerodynamic performance of the body independent of the motion of the air mass relative to the earth, e.g., winds and motions of air due to thermal gradients. The testing of low rate of descent final recovery systems and systems incorporating gliding capacility has, prior to this invention, been seriously handicapped by the absence of apparatus for measuring the relative airspeed of descending decelerator systems. Serious analytical error has occured in the past when rates of descent and glide performance are primarily based on the velocity of the test system relative to the earth. In many instances the movements of air masses are larger than the change in system performance erroneously indicated as brought about by an experimental design modification.

Typical examples of the prior art are exemplified by the following patents. U.S. Pat. No. 3,094,869 to patentee G. Wehmann, U.S. Pat. No. 3,304,778 to patentee M. W. Stuart, and U.S. Pat. No. 3,713,336 to patentees Bernstein and Miller.

SUMMARY OF THE INVENTION

A three-dimensional flow direction determining anemometer that is highly sensitive to low velocity flows is disclosed. The flow velocity is detected by a pair of thermistor beads mounted on a freely turning vane in three-dimensional space. The direction vector sensing is made by a frictionless and dragless light beam photopotentiometer system.

BRIEF DESCRIPTION OF THE DRAWING

FIG. 1 is a pictorial representation of an embodiment of the invention;

FIG. 2 is a side view of an embodiment of the invention;

FIG. 3 is an end view through the vane fins of the embodiment as illustrated in FIG. 2;

FIG. 4 is a schematic, pictorial, section view of a base assembly of a typical embodiment of the invention;

FIG. 5 is a schematic, pictorial, section view of a rotating assembly of a typical embodiment of the invention.

FIG. 12 is a pictorial view of a conventional miniature slip ring capsule assembly; and FIG. 13 is a schematic-pictorial wiring diagram of a complete velocity vector sensor.

DESCRIPTION OF THE PREFERRED EMBODIMENT

Figure 6:
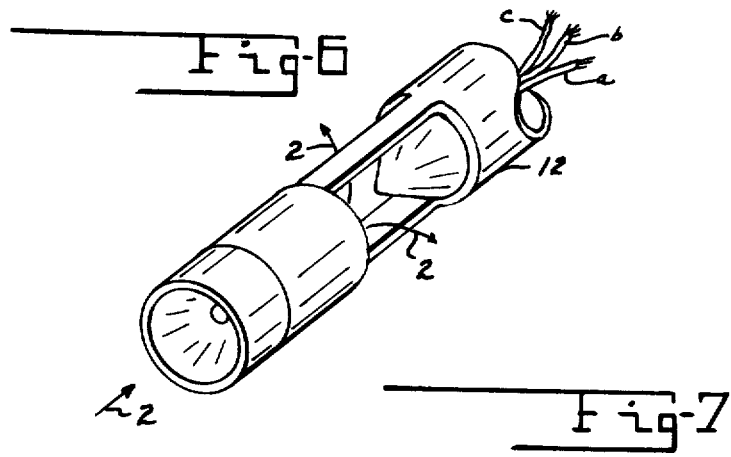
FIG. 6 is a pictorial view of a thermistor bead anemometer head of a typical vane assembly.

A typical embodiment of the invention as illustrated pictorially in FIG. 1 provides an indication of the magnitude and direction of the velocity vector of airflow 2 as reference (i.e., relatively) to coordinates 3 defined on body 4 to which the velocity vector sensor is attached. Generally, it is desirable to have centerline 5 of rotation of the sensor in the arbitrary $y$-$z$ plane, coincidental with the $x$ axis of the payload reference space. All the figures of the drawing refer to a single embodiment of the invention, hence all corresponding elements of the invention appearing in the different figures bear the same reference numeral or letter.

The base assembly 6 of the velocity vector sensor is conventionally and rigidly attached to the payload 4 whose movement relative to a surrounding air mass is desired. Shaft 7 rotates in bearings 8, 9, and 10 in the base assembly 6. The air vane assembly 11, having anemometer head 12, slidably adjustable balance weight 13, and fins 14 and 15, is attached to the rotating assembly 16. The rotating assembly provides freedom of movement of the vane in the $x$-$(yz)$ plane through bearings 17 and 18. (The counterweight 13 is not shown in FIG. 2.)

Figure 8:
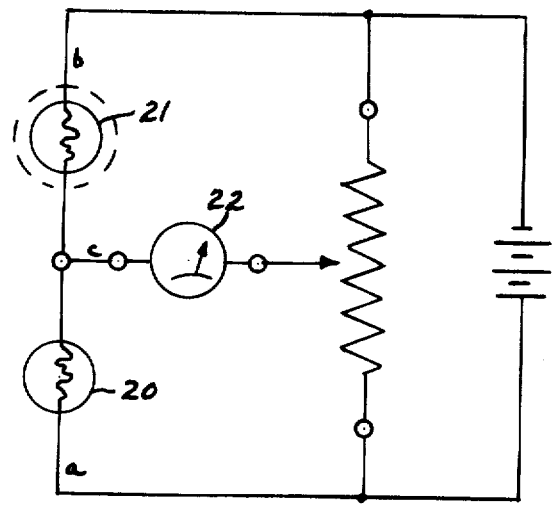
FIG. 8 is a schematic wiring diagram of a simplified velocity indicator comprising an anemometer as illustrated in FIGS. 6 and 7.

The anemometer head 12, positioned at the upstream end of the air vane, contains two thermistor beads 20 and 21. The air stream 2 passes directly over and around the exposed bead 20. Bead 21 is shielded from the air flow. When the beads are placed in a conventional bridge circuit as shown in FIG. 8 and the bridge balanced for zero air flow, then the cooling effect on bead 20 by an air flow 2 will unbalance the bridge and the indicator 22 will provide a reading which may be calibrated in terms of velocity (units per second) of air flow.

In order for the velocity vector sensor to follow and indicate low velocity air flows it is desirable that the minimum feasible frictional resistance be offered to movement of the vane 11 in the three dimensions. For this reason, photopotentiometers are used to translate the angular direction of the vane into electrical signals. By using the sweeping of a light beam from a movable slit in a light shield over a photopotentiometer element all resistance normally encountered in a convention potentiometer slider is eliminated.

Figure 9:
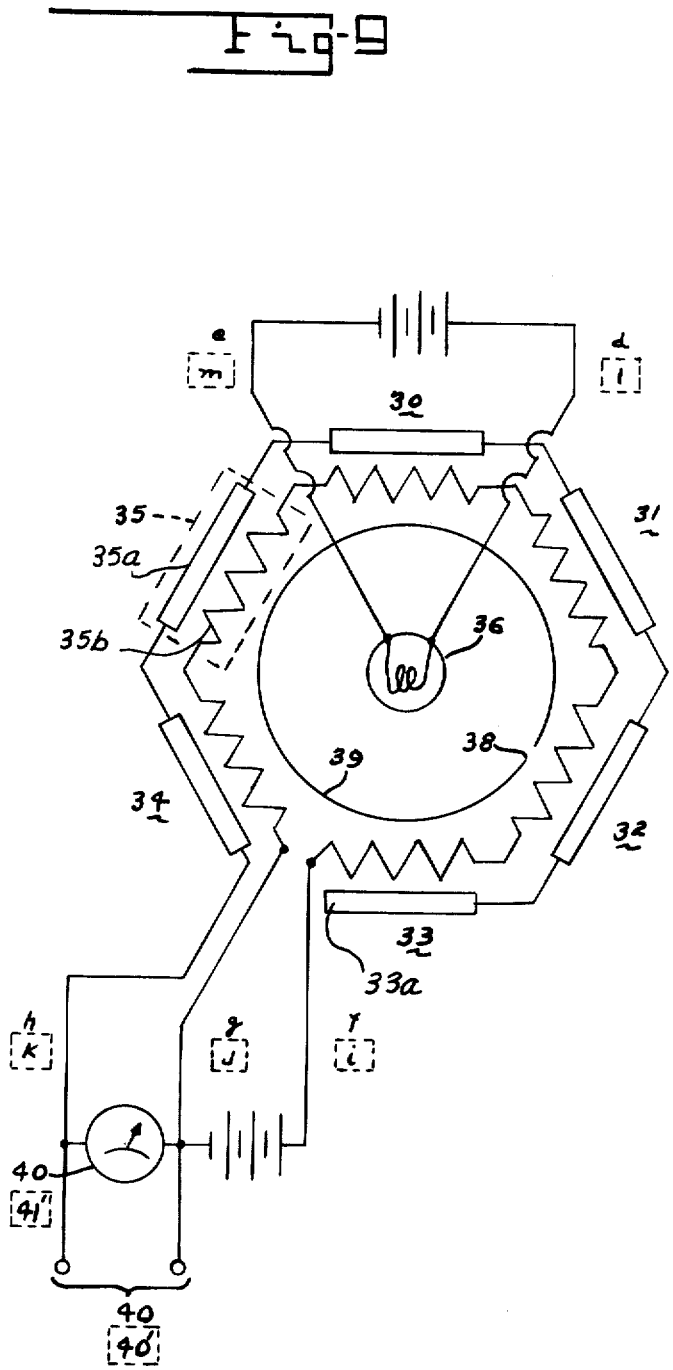
FIG. 9 is a schematic representation of a typical photopotentiometer circuit of a base assembly and a rotating assembly.
Figure 10:
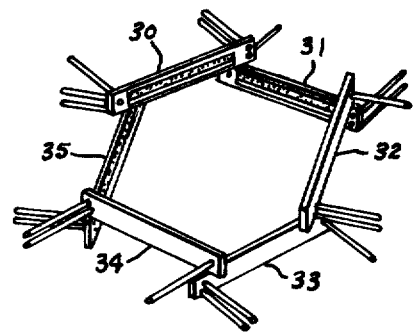
FIG. 10 is a pictorial view of a typical hexagonal arrangement of linear photopotentiometers for providing an angular position indication.
Figure 11:
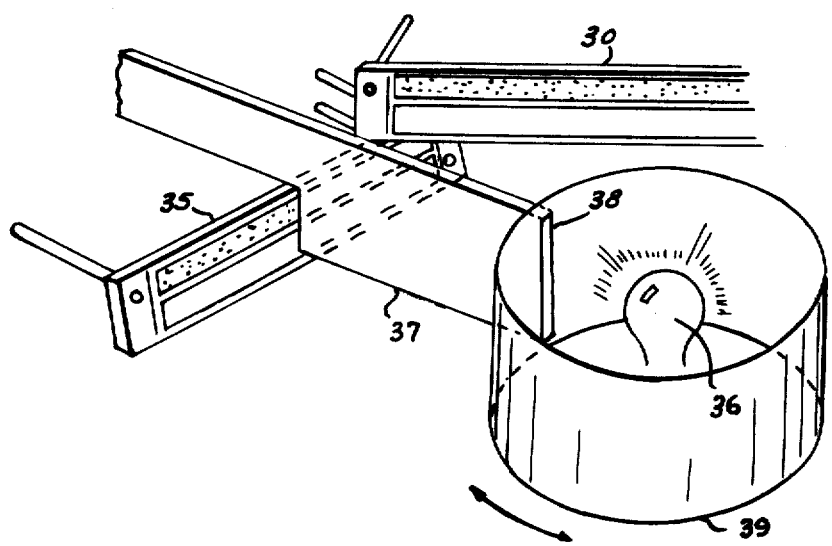
FIG. 11 is a pictorial view showing a movable slit light beam traversing adjacent linear potentiometers.

FIG. 9 illustrates schematically a typical photopotentiometer system suitable for indicating angular positions of the anemometer carrying vane. One photopotentiometer system is located in the rotating assembly 16 to transmit angular position of the vane in an $x$-$(yz)$ plane, i.e., a plane containing the vane and perpendicular to the vane axis of rotation 29, and another photopotentiometer is located in the base assembly 6 to transmit the angular position of the vane in the y-zplane. It has been found that a satisfactory 360° angular photopotentiometer can be fabricated from a hexagonal arrangement of conventional linear photopotentiometer elements as illustrated in FIGS. 9, 10, and 11. Conventional, economical, commercially available, photopotentiometer elements 30, 31, 32, 33, 34, and 35 are arranged in a hexagonal configuration as shown to provide substantially a 360° potentiometer.

Each commercial potentiometer element such as schematically illustrated by dotted line enclosure 35 contains an indium electrode 35a and a thin film resistor 35b. A typical, commercially available photopotentiometer such as schematically represented by element 35 that has been found to be very suitable for this invention is type S.S. MPC 1051. The one end, 33a, of the indium electrode in element 33 does not need any connection. The position indicator 40 indicates the position of aperture 38 as a function of the voltage position of the beam on the resistor ring. This is a magnitude of voltage between the negative and positive battery voltage from one end of the resistor ring to the other end. The action of the photopotentiometer is to transfer this magnitude of voltage to the indium electrode as a voltage with respect to the negative terminal of the battery. The negative terminal of the battery is a common potential point for both the indicating system and the voltage dividing system. It may be considered that there is no voltage drop in the series connected indium electrodes, hence the far end 33a of element 33 may be left open as shown in FIGS. 9 and 13. The small deviations from true angular linearity are generally insignificant in the indicated output of the device. The light from the conventional light bulb source 36 (36' for the bulb in the base assembly 6) is directed in a beam 37 from the slit 38, in the rotatable light shield 39, onto the photoresistive elements to provide photopotentiometers having outputs 40 and 40' to provide readings 41 and 41' that are calibrated to read the angular position of the respective slit 38 with respect to the determined axes 3 of the payload. Since the light shields rotate in their respective planes with the movement of the vane, this is also the angular position of the vane. It is to be noted that if extreme accuracy of indication is desired that the calibration can take into effect the previously mentioned slight nonlinearity of output vs angular deflection. Also the output 40 may be digitally displayed in a conventional analog to digital display unit 50 (FIG. 13). The outputs of the photopotentiometers are calibrated with respect to their physical relationships with a determined reference set of axes of the payload; i.e., a particular voltage 40 (40') provides a reading 41 (41') indicating, in the case of the photopotentiometer unit of the base assembly, the orientation about the axis of the base assembly of a plane containing the vane which is also perpendicular to the vane axis 29, and in the case of the photopotentiometer assembly contained in the rotating assembly, the position of the vane in that plane.

Figure 7:
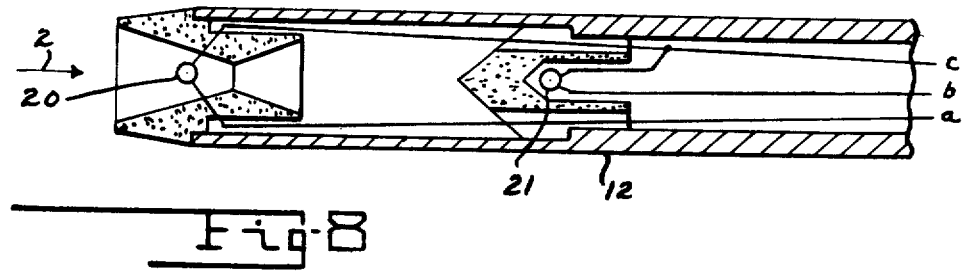
FIG. 7 is a schematic, sectional view of the anemometer head illustrated in FIG. 6.

Referring to FIG. 1, obviously, the vane 11 cannot rotate through a full 360° about the vane axis 29 due to interference of the anemometer 12, the supporting shaft 25, and balance weight 13 with the base 6 and shaft 7. This limits the freedom of movement of the vane in a plane perpendicular to its axis 29 to approximately 300°, however, it is generally rare for the angle between the anemometer and its shaft 25 to be appreciably less than 70° or 80° with the base shaft 7 because for this to happen the payload would usually have to be moving in an upward direction or a down draft considerably greater than the downward motion of the payload would have to occur. Thus, with the angular rotation of the vane less than 360 slip rings are not necessary to conduct the electrical signals from the anemometer head through the rotating assembly 16. The three conductors a, b, and c, (FIG. 7), from the thermistor beads 20 and 21, are run through the hollow shaft 25 and fin support 26 to a small hole 27 in the inside of fin support 26. The conductors are run through the hole 27 into the adjacent hole 28 in the rotating assembly 16. (See also FIG. 5.) Hole 28 rotates with the vane, thus, it is desirable to provide a loose loop in the conductors around the base of the bearing 17 before feeding them up through the fitting 7' and shaft 7. It can be seen from FIG. 5 that eight conductors, i.e., conductor "a" through "h" traverse the shaft 7 to base assembly 6. Since the vane and shaft 7 can swing through 360° in the y-z plane slip rings must be provided to get the electrical signals from the shaft to the stationary (relatively) payload body 4. (The conductors "i" through "m" and their associated elements are stationary with respect to the payload 4 and do not need slip rings.)

A conventional commercially available slip ring assembly 60, FIG. 12, is used to provide electrical connection through the more than 360° rotation, (continuous rotation is provided for), that may occur between the vane and the base. A suitable commercially available slip ring assembly that has proven to be very satisfactory in operating embodiments of the invention is the type P/N D1836 miniature slip ring capsule assembly manufactured by Poly-Scientific of Blacksburg, Va. The total length of the slip ring capsule assembly from end surface 61 to opposite end 62 is approximately 0.840 inches and the diameter of the capsule 60 is approximately 0.225 inches. Obviously, other conventional slip rings and of other sizes compatible with a particular velocity vector sensor being fabricated may be used, as those skilled in the art will recognize. Also, those skilled in the art practicing this invention will readily adapt appropriate source and energizing voltages compatible with the motion and position detectors being utilized. In some embodiments of the invention the flow information obtained may be utilized by personnel on board the device bearing the sensor, with the velocity and vectorial angles read directly from calibrated meters 22, 41, and 41'. Instead of a calibrated dial display, a conventional digital readout 50 may be used. The information signals from the velocity vector sensor on line 70 may be conventionally transmitted by radio link to a remote receiving and indicating display unit for utilization, for instance, at a ground station that is tracking the airborn body with its payload. Such auxiliary information translating and transmitting equipment is not a part of the invention but will be utilized in a conventional manner by those skilled in the art in practice of the invention to extend the utility of the device.

We claim:

1. A velocity vector sensor for measuring the velocity and vectorial direction of the flow of an air mass relative to a payload body moving through the said air mass, the said payload body having a determined three-dimensional reference space, the said velocity vector sensor comprising:
   a. an air vane having an upstream end and an axis of rotation;
   b. an anemometer head positioned at the upstream end of the said air vane and having:

1. a first thermistor bead exposed to the said air mass flow;
2. a second thermistor bead shielded from said air flow;

c. means including an electrical bridge circuit cooperating with the said first and the said second thermistor beads for providing an indication of the velocity of said air flow over said first bead;

d. rotating assembly attached to said air vane providing freedom of movement of the said air vane in a plane containing the said vane axis of rotation;

e. a first photopotentiometer positioned in the said rotating assembly providing an output voltage responsive to the directional position of the said vane in the said plane that contains the vane and the said axis of rotation of the vane;

f. a base assembly attached to the said payload body;

g. a shaft rotatably positioned on said base assembly and attached to said rotating assembly; and h. a second photopotentiometer positioned in said base assembly cooperating with the said rotatable shaft providing an output voltage responsive to the position of the plane containing the said vane in the said reference space.

* * * * *